Nov. 6, 1945.  T. F. MOORE  2,388,640
WELL POINT
Filed Dec. 17, 1943  2 Sheets-Sheet 2
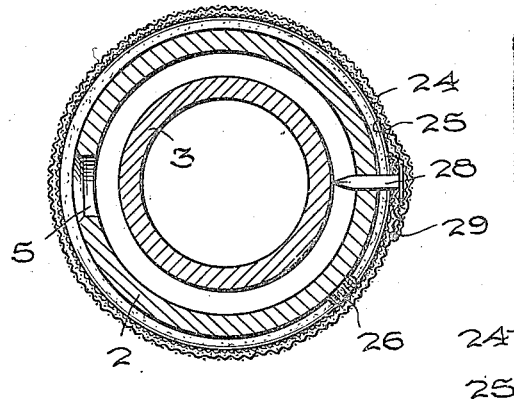
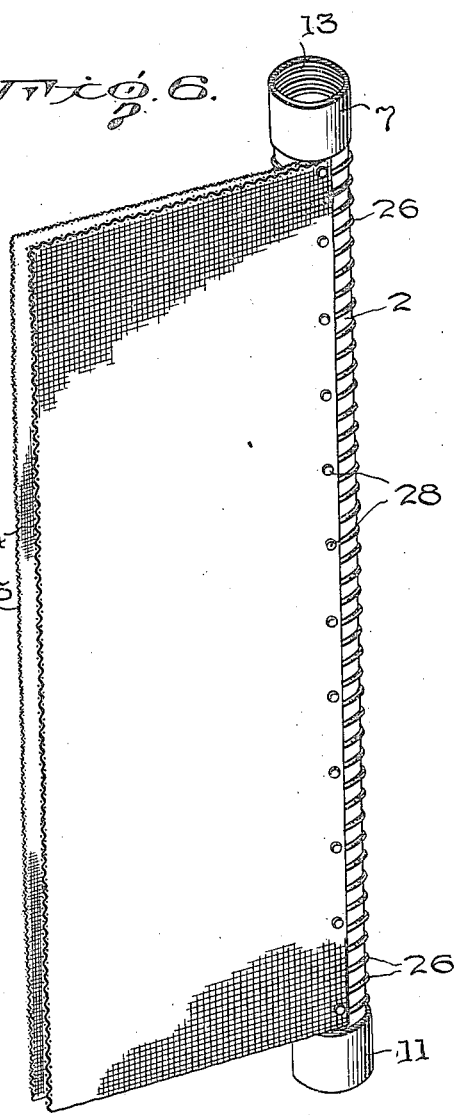
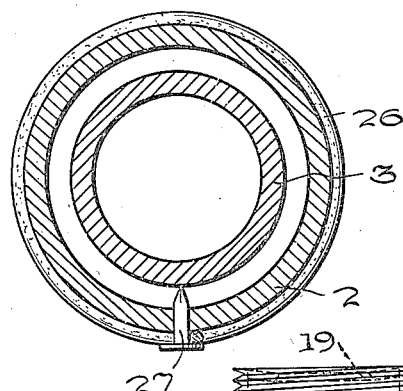
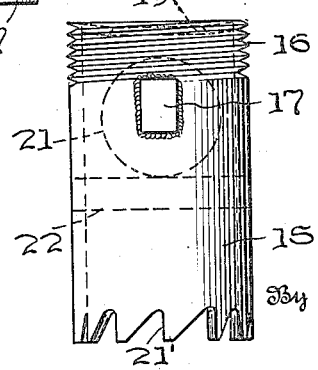
Inventor
T. F. Moore
By Robb & Robb
Attorneys Patented Nov. 6, 1945

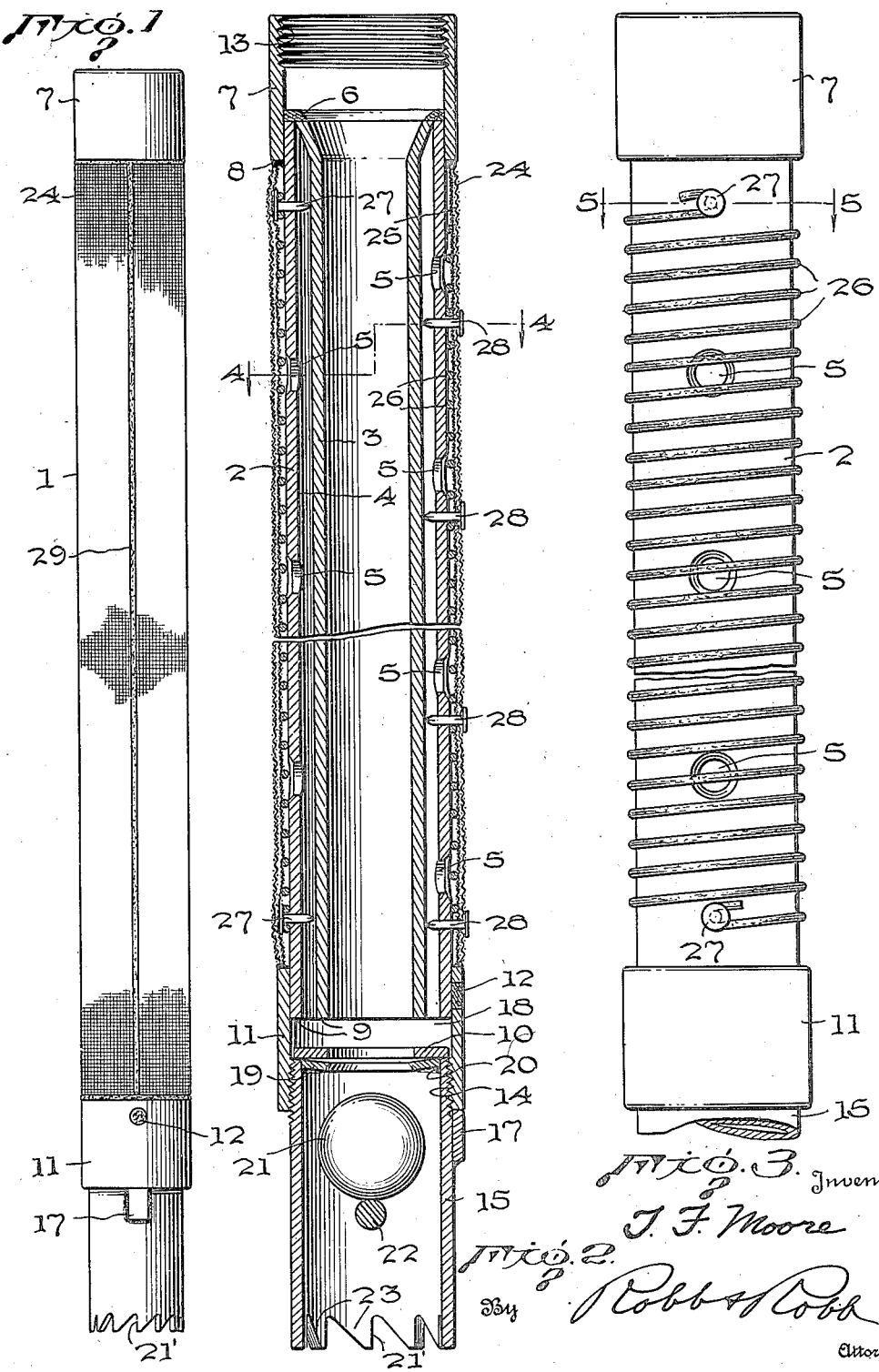

2,388,640

UNITED STATES PATENT OFFICE 2,388,640

WELL POINT

Thomas F. Moore, Morris Plains, N. J.; Edward J. Moore and Mary Moore Dacey, executors of said Thomas F. Moore, deceased Application December 17, 1943, Serial No. 514,686

3 Claims. (Cl. 166—5)

The present invention has to do with apparatus for dewatering or dehydrating the soil, and more particularly to what are commonly known as wellpoints. The use of wellpoints in the drying up of excess moisture in the ground, or in otherwise removing fluids from the soil, is fully explained in certain of my prior patents, more especially, amongst others, Patent No. 2,100,145, granted November 23, 1937, and No. 2,176,540, granted October 17, 1939, the latter of which discloses a complete wellpoint system and describes the operation thereof. Each wellpoint of such a system generally comprises an elongated tubular body having passages therein to direct a jetting fluid downwardly through the wellpoint to enable the wellpoint to be sunk into the ground by the eroding or displacing action of the jetting fluid. In addition, the wellpoint is provided with an intake, usually screened or otherwise equipped with a foraminous filter to prevent stones and other foreign particles from entering the intake where they would otherwise ultimately be drawn up into the system and thus result in damage to the pumping equipment. Suitable valves are embodied in the wellpoint to control the flow of both the jetting fluid and the fluid removed from the soil in the course of the respective jetting and suction actions.

I have found that it has been generally satisfactory to utilize a filter or screen over the intake of the wellpoint, which filter consists of an inner layer of relatively coarse mesh, an outer layer also of relatively coarse mesh, and an intermediate layer of relatively fine mesh. The object of providing the outer coarse mesh screen is to more or less protect the intermediate fine mesh screen from damage during the sinking of the wellpoint into the ground, while the purpose of the inner coarse mesh screen is to provide a pervious support for the intermediate screen, the latter primarily serving to exclude sand, stones, gravel, and other large particles as the fluid in the soil passes into the wellpoint. Such an arrangement is quite suitable where the soil into which the wellpoint is sunk is fairly coarse, but in other soils, fibrous matter coming in with the water sometimes has a tendency to collect in the coarse mesh of the inner screen, thus blocking the passage of water except at such points where the wall of the wellpoint is perforated to allow the water to pass into the interior of the wellpoint.

It is, accordingly, one of the objects of the present invention to provide an improved filter screen for wellpoints, together with novel means for mounting the same on the wellpoint, which together will produce a greatly improved flow of water taken in by the wellpoint, and will minimize stoppage or blockage of the intake.

More specifically referring to the novel mounting means above referred to, it is a further object of this invention to yieldably support the filter screen in such manner as to create a cushioning effect whenever the screen happens to be pressed or forced against stones or other hard bodies encountered in the soil during the sinking of the wellpoint into the ground. By cushioning the screen, bruising and tearing of the screen is practically eliminated and reduced to a minimum during the customary rotating and prying movements which are usually imparted to the wellpoint as it is being sunk into the ground, in order to help dislodge and erode the material in the hole.

A still further object of the invention is to provide an improved well point tip and valve assembly wherein the wellpoint tip is readily removable from the body of the wellpoint, as by means of a threaded connection between the tip and the body. Such tips are customarily serrated at their lower extremities to facilitate the erosion and dislodgment of the material in the hole during the sinking of the wellpoint into the ground, in the course of which the wellpoint is usually rotated or oscillated about its central axis as previously mentioned. Where the tip is threadedly connected to the body of the wellpoint, such rotation or oscillation would tend to loosen or completely unscrew the tip. Accordingly, to prevent this from happening, I have devised a novel form of serrated tip, wherein the serrations are of such shape and are so arranged as to be more effective in their movement in one direction than the other.

A further object of the invention is to provide an improved valve assembly in association with the wellpoint tip, which valve assembly includes an annular valve member which is automatically operated by the jetting fluid to a position preventing the back waste of water through the intake of the wellpoint, and which includes a second valve and valve seat disposed in the wellpoint tip and which is automatically operated to cause the second valve to engage the seat to close the lower end of the wellpoint during the suction operation. The improvement in this assembly is characterized by the novel arrangement of the valve seat aforesaid, which is so formed as to facilitate and improve the automatic operation of the annular valve by the jetting fluid during the jetting operation.

Other and further objects and advantages of the invention will be herein described and the novel features thereof defined by the appended claims.

In the drawings:

Figure 1 is a view in elevation of my new wellpoint in its fully assembled condition;

Figure 2 is a view in vertical section through the wellpoint, taken about on the central axis of the same, and showing the parts of the wellpoint on a somewhat larger scale than Figure 1;

Figure 3 is a fragmentary view in elevation of the wellpoint with the filter screen removed, and particularly showing the spirally-wrapped cushioning support about which the filter screen is normally wrapped, the lower portion of the tip at the bottom of the wellpoint being broken away;

Figure 4 is a sectional view taken on the line 4—4 of Figure 2;

Figure 5 is a sectional view taken on the line 5—5 of Figure 3;

Figure 6 is a perspective view of the wellpoint body, together with the filter screen, and showing the two layers of the filter screen and the manner of anchoring the same to the wellpoint body preliminary to wrapping the screen about the body; and Figure 7 is a view in elevation of the wellpoint tip which is illustrated on a somewhat enlarged scale.

Like reference characters designate corresponding parts in the several figures of the drawings, wherein 1 designates generally the wellpoint body which is of elongated tubular form and comprises an outer pipe 2 and an inner pipe 3, the latter being arranged coaxially relative to the outer pipe and radially inwardly spaced therefrom to define an annular passage 4 therebetween. The outer pipe 2 is perforated as indicated at 5, said perforations being arranged in one or more rows running vertically of the pipe. The arrangement of the perforations as shown in the drawings is such that the perforations are in two rows at diametrically opposite sides of the pipe, the perforations of each row being equi-distantly spaced apart, and the perforations of one row being on elevations intermediate the perforations of the other row.

The inner pipe 3 is flared outwardly at its upper end and is secured to the upper end of the outer pipe 2 as by means of welding, as indicated at 6, thus closing the upper end of the annular passage 4. A coupling 7 is attached to the upper ends of the pipes 2, 3 in any suitable manner, as by means of the weld 6, and/or by welding the lower edge of the coupling to the outer pipe 2, as at 8. The lower ends of the two pipes 2, 3 terminate in the same plane and are preferably milled to form a seat 9 for the annular valve member or ring valve 10 which is loosely disposed in the lower coupling 11, the latter being secured to the outer pipe 2 in any suitable manner, as by weld 12.

The upper end of the upper coupling 7 is interiorly threaded, as at 13, so that the wellpoint may be attached in the usual manner to a pipe leading to the jetting and suction equipment of the wellpoint system. The lower coupling 11 is interiorly threaded at its lower end, as indicated at 14, for connection to a jetting tip 15 which is threaded at its upper end, as at 16, for engagement with the threads 14. Fixed to the outside of the jetting tip 15 is a stop or jamblug 17, which may be secured thereto by welding or in any other suitable manner. The purpose of this stop or jamb-lug is to limit the upward movement of the jetting tip 15 into the lower coupling 11 and thus cause the extreme upper end of the jetting tip 15 to assume a fixed distance below the milled ends 9 of the pipes 2, 3 when the jetting tip is screwed into the coupling 11. This accordingly provides a limited working space for the annular valve member 10 in the valve chamber 18, it being understood that the annular valve member 10 is free to move in an upward and downward direction between the upper valve seat 9 and the upper end of the jetting tip 15, as best shown in Figure 2 of the drawings.

The top of the jetting tip 15 is provided with a valve seat 19 which is welded interiorly of the same, as at 20, or for greater convenience of assembly, may be welded to the extreme upper end of the jetting tip, after which, the end of the jetting tip may be milled, ground, or otherwise finished off to provide a smooth rest or seat for the annular valve member 10. The primary purpose of the valve seat 19 is to provide a seat for a floating ball check 21 which functions in the manner of a float valve member. This valve seat 19 has the form of an annular ring which is preferably depressed at its center, or dished in a downward direction, for a purpose which will hereinafter more fully appear. Downward movement of the ball check 21 is limited by a pin 22 extending transversely through the jetting tip 15 at such distance below the upper end of the jetting tip that, when the ball check valve member rests upon the pin 22, the ball will be spaced below the valve seat 19, thus uncovering this seat.

The lower end of the jetting tip 15 is serrated to provide a series of teeth 23 which are utilized to assist in eroding the soil and dislodging the same, by rotary or oscillatory movement imparted to the wellpoint during the jetting operation. These teeth 23 have a particular shape, according to one feature of this invention, as will be hereinafter more fully referred to.

In order to prevent sand, stones, gravel and other foreign material from entering the wellpoint during the suction operation, the wellpoint body is provided with a filter screen extending about the same over the perforations 5. As shown in the drawings, this screen preferably comprises an outer screen 24 of relatively coarse mesh and an inner screen 25 of relatively fine mesh, the two screens being wrapped in superimposed layers about the wellpoint body. As seen best in Figure 2 of the drawings, the screens are preferably spaced from the outer pipe 2. In certain of my prior wellpoint constructions, this spacing of the screens has sometimes been obtained by the use of a third relatively coarse screen disposed inside the fine screen and wrapped directly about the outer pipe 2, but I have found that with such an arrangement, fibrous matter has a tendency to collect in the mesh of the innermost screen when the wellpoint is used in certain types of soils, thus blocking the passage of water along the outside pipe except at the point where the perforations 5 are directly beneath the screen. To eliminate this difficulty, I have found that the third screen above referred to may be omitted, and in lieu thereof, the outer pipe 2 is wrapped spirally with a cord 26 or other suitable flexible spacing means, after which the two screens 24 and 25 are wrapped about the wellpoint body over the cord. The opposite ends of the cord 26 may be anchored to the outer pipe 2 by flat-headed nails 27, 27, or other suitable fastening means, which are driven tightly into the outer pipe 2, and for which purpose suitable openings are provided in this pipe adjacent to the upper and lower ends thereof respectively, to receive the nails.

In wraping the screens 24, 25 about the body of the wellpoint, over the cord 26, the vertical edges of the two screens are brought together, and these edges are nailed to the outer pipe 2, as by means of flat-headed nails 28, which may be tightly driven into suitable openings provided in the pipe for this purpose, as best shown in Figures 2 and 6. After anchoring the edges of the screens 24, 25, the screens are then wrapped about the body of the wellpoint over the cord 26 until the opposite vertical edges of the screens overlap the first edges of the screens, preferably slightly beyond the nails 28, following which, the edges of the screens are soldered to the mesh itself, as indicated by the vertical seam 29 shown in Figure 1, and the upper and lower ends of the screens are respectively soldered to the lower and upper ends respectively of the upper coupling 7 and the lower coupling 11, thereby presenting a smooth surface of uniform size from end to end of the wellpoint body.

In spacing the filter screens 24, 25 from the outer pipe 2 through the use of the spirally-wrapped cord 26, several important advantages are obtained by utilizing a cord which is relatively soft or yielding, and which at the same time is fire-resistant or fireproof. I have found that asbestos cord is excellently suited for this purpose, as it is comparatively soft and yielding, and thus reduces the danger of abrasion in supporting the filter screens in spaced relation to the outer pipe 2 of the wellpoint. Also, having in view the custom of rotating or oscillating the wellpoint as it is being sunk into the ground during the jetting operation, and the imparting of prying movements to the wellpoint to assist in the dislodgment and erosion of the material in the hole, damage to the filter screens is minimized by the cushioning action of the relatively soft asbestos cord. Thus, if sharp stones and other hard spots are encountered in the soil during the jetting operation, the filter screens will not be pinched sufficiently hard to cut or bruise the screens, as oftentimes happens where the filter screen is incapable of yielding by reason of being rigidly supported or backed up by an unyielding support.

A further advantage in the use of a fireproof asbestos cord in the manner above described is that such cord will withstand heat where other cords would not. This is an important consideration in the light of the fact that heat is employed in soldering the outer ends of the screens 24, 25 to the body of the mesh after wrapping the screens about the cord. This heat will thus not have any adverse effect upon the cord. Sometimes it is necessary to remove and replace damaged filter screens, in which event, raising of the wellpoint to furnace heat to melt the solder, in order to permit removal of the old screen, will not impair the asbestos cord.

The use of the nails 28 in anchoring the inner edge of the filter screens is likewise an important advantage over the prior practice of anchoring the screens by soldering the same directly to the pipe 2. In practice, it has been customary to apply a protective coating to the wellpoint body before assembling the filter screens, this protective coating usually being lacquer, which makes it impossible to solder the screens to the pipe 2 without first filing the pipe to provide a clean surface, or otherwise removing the lacquer at the point of anchorage of the screens, to make the solder adhere. It would be exceedingly difficult to perform the filing operation or other removal of the lacquer without damaging the cord, whereas the use of the short nails 28 makes this unnecessary, and furnishes a quick and easy method of anchoring the screens 24, 25.

Referring again to the teeth 23 on the lower end of the jetting tip 15, it will be seen from the drawings that the faces of these teeth are so shaped that each tooth has a vertical face on one side and an inclined face on the opposite side. Thus, the axis of each tooth may be said to be inclined respecting the vertical axis of the wellpoint. This has the important advantage in causing the teeth to perform a more effective cutting or erosive action when the wellpoint is rotated or oscillated in one direction, as compared with the action when the rotation or oscillation is in the other direction. As will be seen from the drawings, the vertical faces 21' of the teeth are at the lefthand side of the respective teeth when viewed in elevation as shown in Figure 1 of the drawings. Thus, when the wellpoint is rotated about its central axis in a clockwise direction, these vertical faces 21' of the teeth will produce the maximum cutting action, and hence the reactive force on the teeth will tend to tighten the jetting tip 15 in the threaded coupling 11, in the case of a righthand thread. Reversal of the rotation or oscillation of the wellpoint reduces the cutting action of the teeth 23 by reason of the action of the inclined faces of the teeth. In effect, this reduced cutting action is very small, so that there is little or no tendency for the jetting tip 15 to become loosened or unscrewed from the coupling under these conditions.

In the operation of the wellpoint, the upper coupling 7 is first connected to a source of jetting fluid, which usually is water, and the water is driven downwardly under pressure through the inner pipe 3 of the wellpoint, causing the annular valve member 10 to rise upwardly in the chamber 18 into engagement with the seat 9, thus closing the passage 4 to prevent back waste of the water through the perforations 5 in the outer pipe 2, and outwardly through the filter screens 24, 25. Due to the depression of the valve seat 19 for the ball check 21, which valve seat occupies a position immediately below the annular valve member 10, the jetting water may readily enter the space between the upper side of the valve seat 19 and the lower side of the annular valve member 10, pursuant to the reactive pressure of the jetting water, and hence insuring the raising of the annular valve member 10 to its upper position in engagement with the seat 9. Since the passage 4 is closed by the annular valve member 10, the water is therefore compelled to continue downwardly through the jetting tip 15, displacing the ball check 21 in a downward direction away from the seat 19, and continuing past the ball check where it is ultimately discharged from the bottom of the jetting tip. The force of the jetting fluid is utilized to erode and dislodge the underlying soil, which is further facilitated by the rotation or oscillation of the wellpoint about its vertical axis, together with prying movements imparted to the wellpoint, as hereinbefore described. As the jetting operation continues, the wellpoint progressively sinks into the soil until the desired depth has been reached, at which time the jetting operation is discontinued. Thereafter, the coupling at the upper end of the wellpoint may be connected by suitable pipes and headers to the pumping system which produces a suction action on the wellpoint, and thereby drawing water or other fluids out of the soil. During this suction operation, the annular valve member 10 drops to the bottom of the chamber 18 and rests upon the upper end of the jetting tip 15, thereby opening the annular passage 4 so that water or other fluid in the soil coming into the wellpoint through the screens 24, 25 and perforations 5, may pass downwardly through the passage 4 into the chamber 18, and thence upwardly through the inner pipe 3. At this time, the water collecting in the bottom of the hole will cause the floating ball check 21 to rise against the seat 19, thereby closing the bottom of the wellpoint against the entrance of sand, stones and other foreign material which might otherwise be drawn up into the wellpoint through the jetting tip. As the water passes inwardly through the filter screens 24, 25, it freely flows through the spaces between the turns of the cord 26 until it reaches the perforations 5 through which it may pass through the outer pipe 2 and into the annular passage 4. Because of the spacing of the screens from the outer pipe 2, as produced by the cord 26, and the adequate spaces between turns of the cord, there is no tendency for fibrous matter or other materials to collect in the filter screens and thus stop or block the mesh.

It will be understood from the foregoing that the term "cord," as used herein, is intended to be taken in its broadest sense, and is not limited to materials either of a textile nature, or of any specific cross section. Likewise, the term "nails" is intended to embrace any equivalent fastenings or anchoring instrumentalities, including screws and the like.

While the specific details have been herein shown and described, my invention is not confined thereto, as changes and alterations may be made without departing from the spirit thereof as defined by the appended claims.

I claim:

1. In a wellpoint of the class described, having a perforated tubular body and having jetting and suction fluid passages respectively within the same, and a foraminous envelope disposed about the tubular body and lying over the perforations, a yieldable cushioning means between the foraminous envelope and the tubular body, said cushioning means having the form of flexible fire-resisting material spirally wound about the tubular body with its turns axially spaced from each other.

2. Apparatus as defined in claim 1, wherein the yieldable cushioning means has the form of axially spaced turns of asbestos cord spirally wound about the tubular body.

3. In a wellpoint of the class described, comprising a perforated tubular body having jetting and suction fluid passages within the same and a foraminous envelope extending about the tubular body in radially outwardly spaced relation to the same, said foraminous envelope having one of its vertical edges anchored at axially spaced intervals to the tubular body, and having its opposite vertical edge overlapped upon and secured to the envelope adjacent to the first-mentioned vertical edge, and spacing means between the foraminous envelope and the tubular body, said spacing means comprising a continuous length of relatively soft cord-like material spirally wound about the tubular body and anchored thereto at its opposite ends.

THOMAS F. MOORE.